May 21, 1957  P. REICHARDT  2,792,902
PORTABLE APPARATUS FOR DETECTING AND LOCATING NOISES
Filed May 29, 1953
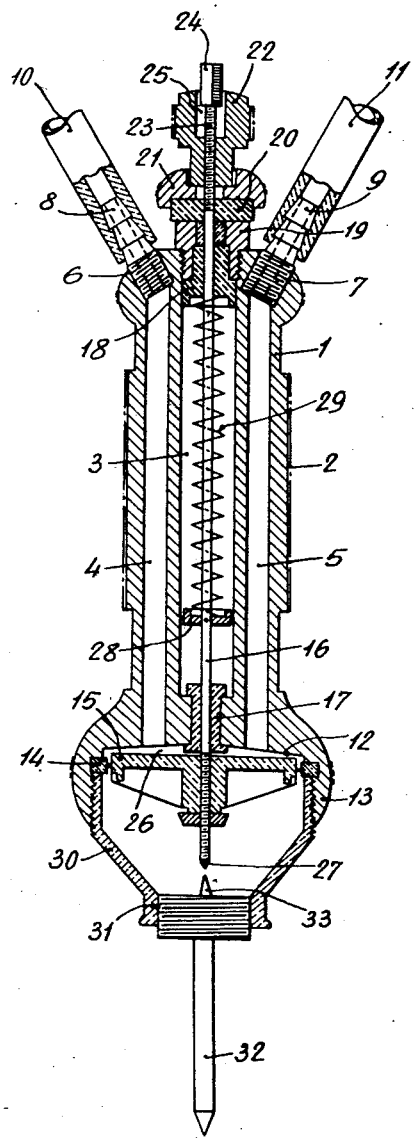
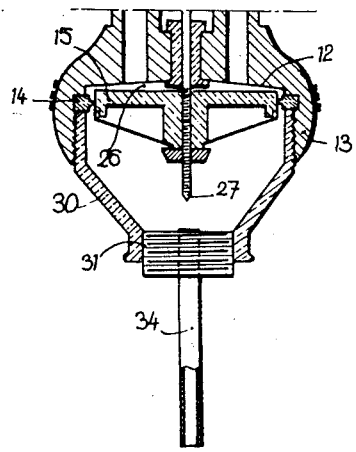
INVENTOR
PIERRE REICHARDT
By Linton and Linton
ATTORNEYS

United States Patent Office 2,792,902
Patented May 21, 1957

2,792,902
PORTABLE APPARATUS FOR DETECTING AND LOCATING NOISES

Pierre Reichardt, Brussels, Belgium

Application May 29, 1953, Serial No. 358,291

Claims priority, application France October 7, 1952

4 Claims. (Cl. 181—24)

The invention relates to apparatus of the kind used for detecting and locating noises and has special reference to a portable apparatus of this type which is particularly advantageous as a means for detecting noises in running mechanical assemblies and moving fluids, and for detecting and locating abnormal noises. With this apparatus it is therefore possible to check the operation of elements in an installation which are not directly visible.

The apparatus according to this invention consists essentially of an integral metal body forming a handle provided at one end with a chamber adapted to function as a resonance-cavity, a valve-forming closing disc constituting the outer boundary of the resonance-cavity, a packing ring or sealing washer carried by the metal casing and engaging the outer periphery of the valve disc, an adjustment member disposed on the side opposite to this valve disc and adapted to displace an axial rod carrying this valve disc so as to open same by moving it away from said casing beyond the packing ring and to close this valve by moving it toward the bottom of said cavity, thereby causing the volume of this cavity to vary until the valve engages the bottom thereof for transmitting sounds collected therein, and sound-transmitting tubes for connecting the resonance-cavity to ear-phones.

The valve disc may advantageously be provided on its outer face with a feeler member adapted to engage the members through which it is desired to find noises emitted from elements of which the operation or noise level is to be checked.

The extremity of the apparatus wherein the resonance-cavity and valve assembly is fitted may be provided with a bell-shaped member, preferably of molded insulating material, so as to form a kind of sound-box for those cases wherein the noises to be detected are to be heard through the surrounding atmosphere.

This bell may be provided with a detachable tubular extension consisting for example of one or a plurality of telescopically interfitting elements notably for detecting gas leaks.

The bell member may also be provided with a conductive contact rod formed with a pointed end positioned inside the bell in axial alignment with the pointed end of the valve feeler member for those cases wherein the apparatus is to be used in connection with the control of electrical circuit voltages by listening-in to noise produced by electrical sparks occurring between the contact rod and the valve feeler member at certain positions of adjustment of the valve.

The accompanying drawing forming part of this specification illustrates diagrammatically by way of example in Fig. 1 one form of embodiment of the invention, the apparatus being shown in axial section without the ear-phones which may be of any desired and suitable type. Fig. 2 is a cross sectional partial view of a modified form of the apparatus.

Referring now more particularly to the drawing wherein like and corresponding parts are designated by similar reference characters the apparatus of Fig. 1 has a unitary metal body 1 having the general shape of a handle and formed if desired with a knurled outer surface 2 to facilite the gripping of the apparatus.

This body 1 is formed internally with an axial chamber 3 adapted to receive the adjustment control members and with a pair of longitudinal passages 4, 5 leading to corresponding internally screw-threaded holes 6, 7 formed at one end of the body 1 and adapted to receive corresponding tubular fittings 8, 9 on which a pair of flexible sound-transmitting tubes 10, 11 can be fitted. These tubes 10, 11 lead to a pair of ear-phones (not shown) which may be of the stethoscope type. To simplify the disclosure, it will be assumed hereafter that the end of apparatus which carries the fittings 8, 9 is the upper end of the apparatus, although the apparatus can be utilized in any desired positions.

At its lower end the body 1 is formed with a slightly concave bottom 12 formed with a pair of perforations constituting the orifices of the passages 4, 5. Beyond this bottom 12 the body 1 is formed with a peripheral enlarged annular extension 13 the inner face of which is formed with a groove receiving a packing ring or sealing washer 14 of resilient material such as natural or synthetic rubber, having for example the radial section shown in the drawing. This packing ring is intended to engage the outer periphery of a metal disc 15 acting as a valve member and carried by the screw-threaded end portion of an axial rod 16 extending through a lower guide member 17, the central passage 3 and an upper guide member 18. Both guide members 17, 18 may consist of rubber or like vibration-damping material. The upper guide member 18 is mounted in the top wall of the body 1 by means of a screw-plug or like member 19 screwed in axial alignment with the central passage 3. The rod 16 extends upwards through a rubber or like washer 20, an annular member 21 acting as a bearing for a rotary control button 22 screwed on the screw-threaded upper portion 23 of the rod 16. The topmost portion 24 of this rod 16 may be graduated and is adapted to penetrate more or less into a corresponding cavity 25 of the button 22.

The gap between the bottom wall 12 and the valve 15 constitutes a resonance-cavity 26 and the lower end of rod 16 may extend through the valve disc 15 to form a feeler member terminating with a point 27. Between the upper guide member 18 and an abutment member 28 fastened to the rod 16 within the passage 3, a compression coil spring 29 is mounted and constantly urges the rod downwards.

Below the packing ring 14 the inner surface of the annular extension 13 of the body 1 has screwed thereon a bell-shaped member 30, for example of molded insulating material, formed at its bottom end with an internally screw-threaded aperture 31 adapted to receive different attachments according to the various applications in which the apparatus is to be used.

In the example shown in the drawing a metal feeler rod 32 formed at either end with a point is mounted in the bell 30; the upper point 33 of this rod registers with the lower point 27 of the central rod 16 of the apparatus, the gap therebetween depending on the adjustment of the button 22.

From the foregoing it will be readily understood that the compression spring 29 urges the assembly consisting of rod 16 and valve 15 downwards, while the same assembly abuts through the adjustment button 22 against the annular member 21 clamped in turn against the washer 20. By rotating the button 22 in the direction whereby it is unscrewed from the screw-threaded end 23 of rod 16, the latter is moved downward by the pressure exerted by the spring 29 and the valve disc 15 moves away from the bottom wall 12 while the graduated upper end 24 of the rod 16 engages correspondingly the cavity 25. By effecting the reverse operation the valve disc 15 will be moved toward the bottom surface 12. Thus, each relative position of the valve can be read on the graduated end portion 24 of rod 16 which appears just above the adjustment button 22 outside the cavity 25. As a result, the valve 15 is adapted to be moved from a lower end position in which it is clear from the packing ring 14 and connects the resonance cavity 26 with the outside, and an upper end position in which the valve disc bears directly against the bottom 12, for instance against the outer periphery thereof. When the valve is in any one of its upper positions it is in fluid-tight engagement with the packing ring 14 so that the longitudinal passages 4, 5 cannot communicate with the surrounding atmosphere and are therefore not influenced by external atmospheric noises.

The apparatus may be used in an extensive field of applications. If the bell 30 is not used and the body of the apparatus or its feeler member 27 is pressed against members through which the noises to be found are transmitted, the valve 15 being closed, these noises will be transmitted through the medium of the metal valve 15 and through the body 1 of the apparatus, and are subsequently magnified in the resonance cavity 26 the volume of which is adjustable at will by turning the button 22 to adjust this cavity to the frequencies of the sounds to be perceived. By more or less rotating this button in one or the other direction the volume of the resonance cavity 26 can be reduced or increased while keeping the valve 15 closed, and it will be seen that in one or more positions of the control button 22 or valve 15 a maximal amplification of the noises is obtained according to the frequency of the sounds of which these noises are made. If the valve 15 is caused to bear directly against the bottom 12 the assembly will somewhat act as a rigid unit and the apparatus will behave as if it constituted an extension of the mass of the member against which it is applied; apparently, in this case no actual vibration of the valve occurs but the noises are transmitted through undetectable displacements of particles of the material, so that the noises, if any, are heard as through a single mass of material.

If, by rotating the control button 22 the valve 15 is moved away from the bottom 12 until the valve clears the packing ring 14, the passages 4, 5 will communicate with the surrounding atmosphere and the noises transmitted through this atmosphere, especially very faint noises, such as those resulting from air or gas leaks, will be heard. If the apparatus is then fitted with the bell member 30 and the latter extended by a tubular attachment 34 which is subsequently displaced in the vicinity of the parts or apparatus to be checked for noise, it is possible to detect and locate with the utmost accuracy air or gas leaks, for the noise produced becomes very audible and passes through a maximum value as the attachment registers exactly with the leak.

The tubular attachment mentioned in the preceding paragraph may be replaced by a conductive rod 32 fitting the lower end of the bell-shaped member 30 as shown in the drawing; in this case the body 1 will be connected to the ground, and it will become possible to study electrical loads or voltages by listening-in to the noise of discharge sparks produces between the points 27 and 33. Indeed the displacement of the adjustment button 22 will indicate the value of the spark gap 27—33 when the sparks occur and therefore the operator will be able to calculate the voltage from which these sparks are derived. Thus, if the apparatus thus equipped is applied to the ignition spark plugs of an explosion engine and the body 1 is electrically connected directly to the mass of the engine, it will be possible to check whether the various spark plugs operate in the same manner, that is, if they produce sparks at the spark gap 27—33 for a given and same position of the adjustment button 22. If not, the faulty plug can be readily found.

While the above description and the accompanying drawing refer to only one form of embodiment of the apparatus of this invention which is given by way of example, it will be readily understood that many modifications may be brought thereto without departing from the spirit and scope of the invention as set forth in the appended claims.

What I claim is:

1. A portable noise detector comprising an integral, substantially cylindrical, handle-like metal body having an axial passage, one end of said body constituting the inner wall of a resonance-cavity, a valve-forming closing disc constituting the outer wall of said resonance-cavity, a packing ring carried by said metal body and in fluid-tight engagement with the outer periphery of said valve disc, a rod fixedly connected to said valve disc, said rod extending through said axial passage in said casing, means mounted at the other end of said body in said axial passage and cooperating with said rod for opening and closing said valve disc and moving same either beyond said packing ring to a position in which said resonance-cavity communicates with the external atmosphere, or in the opposite direction toward said inner wall of said resonance-cavity to permit variation in the volume of said resonance-cavity until said valve disc engages said inner wall for noise-transmitting purposes, said body further having a pair of side passages parallel to and extending on either side of said axial passage from said one end to the other end of said body, pipe fittings mounted in said lateral passages at said other end, ear phones, flexible pipes mounted on said pipe fittings for connecting said resonance-cavity and said lateral passages to said ear-phones.

2. A portable noise detector comprising an integral, substantially cylindrical, handle-like metal body having an axial passage, one end of said body having an enlarged annular portion constituting the side wall of a chamber closed at its inner end by said one end of said body, a bell-shaped member detachably mounted in said enlarged annular portion of said body closing the outer end of said chamber, said side wall having an annular groove, a packing ring of flexible material fitted in said groove, a valve-forming disc mounted in said chamber and in fluid-tight engagement through its outer peripheral edge with said packing ring, said chamber, packing ring and valve disc being coaxial with said body, said one end of said body, said valve disc and said packing ring constituting a resonance-cavity, a rod fixedly connected to said valve disc and projecting with a pointed end to some extent from the outer face of said valve disc, the other end of said rod projecting from the opposite end of said body, means at said other end of said rod for adjusting the axial position of said rod and valve disc assembly relative to said body, and consequently varying the volume of said resonance-cavity, spring means urging said valve disc away from said one end of said body to the extent permitted by said volume-adjusting means, said adjustment means being adapted to move said valve disc in one direction to a position wherein said valve disc clears said packing ring and connects said resonance-cavity with the surrounding atmosphere, and in the other direction to a position wherein said valve disc while maintaining its fluid-tight engagement with said packing ring contacts said one end of said body so as to reduce the inner volume of said resonance-cavity to a minimum, said body further having a pair of lateral passages formed parallel to, and on either side of, said axial passage and extending from one to the other end of said body, pipe fittings mounted in said lateral passages at said other end of said body, ear-phones, flexible pipes mounted on said fittings for connecting said resonance-cavity and said lateral passages to said ear-phones.

3. A portable noise detector according to claim 2, wherein said bell-shaped member consists of molded plastic material and is formed at its outer end with an internally screw-threaded hole, and a plurality of extension attachments to increase the reach of the apparatus, each having a threaded end for threadedly engaging said member hole for attachment thereto.

4. A portable noise detector according to claim 2, wherein said bell-shaped member consists of molded plastic material, a fixed feeler rod having two pointed ends, means connecting said feeler rod to the outer end of said bell shaped member with the inner point of said feeler rod registering with said pointed end of said valve-carrying rod to form a spark-gap therebetween, the outer point of said feeler rod forming a feeler member adapted to engage the members through which it is desired to detect noises from elements the noise level of which is to be checked.

References Cited in the file of this patent

UNITED STATES PATENTS

| | | |
|---|---|---|
| 2,360,733 | Smith | Oct. 17, 1944 |
| 2,607,999 | Stedman | Aug. 26, 1952 |
| 2,670,806 | Sebastiani et al. | Mar. 2, 1954 |

FOREIGN PATENTS

| | | |
|---|---|---|
| 892,291 | France | Sept. 21, 1942 |
| 856,068 | Germany | Nov. 17, 1952 |
| 1,064,178 | France | May 11, 1954 |